J. G. MIDGLEY.
WATER AND AIR RELIEF VALVE.
APPLICATION FILED APR. 17, 1906.
930,207.
Patented Aug. 3, 1909.
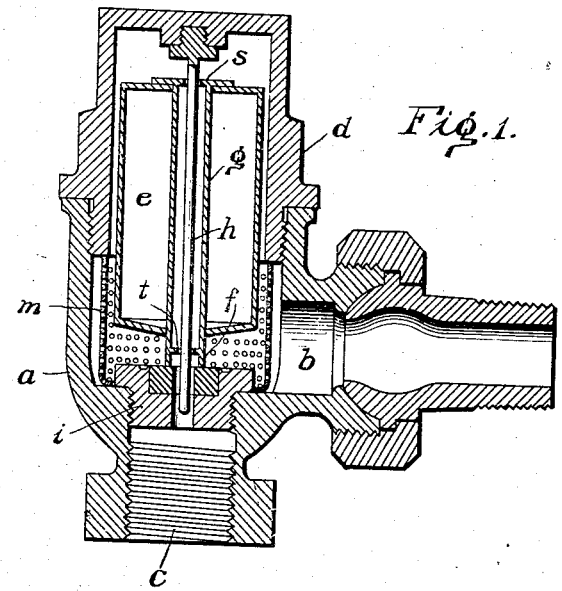
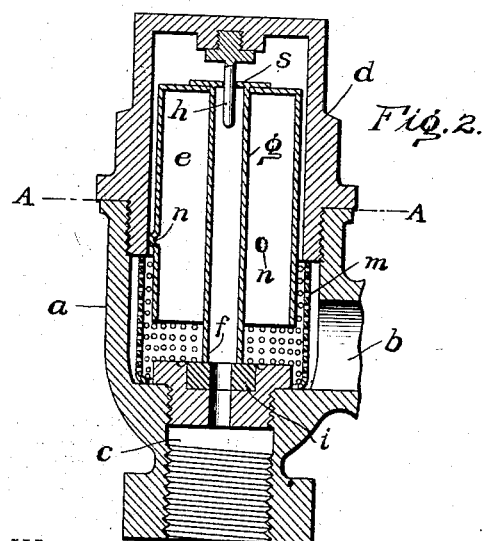
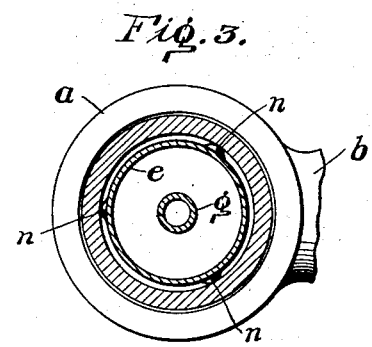
WITNESSES:
D. Webster, Jr.
P. M. Kelly
INVENTOR
John G. Midgley
BY
Attorney

UNITED STATES PATENT OFFICE.

JOHN G. MIDGLEY, OF SALT LAKE CITY, UTAH, ASSIGNOR TO WARREN WEBSTER & CO., OF CAMDEN, NEW JERSEY, A CORPORATION OF NEW JERSEY.

WATER AND AIR RELIEF VALVE.

No. 930,207.  Specification of Letters Patent.  Patented Aug. 3, 1909.

Application filed April 17, 1906. Serial No. 312,077.

*To all whom it may concern:*

Be it known that I, JOHN G. MIDGLEY, of Salt Lake City, county of Salt Lake, and State of Utah, have invented an Improvement in Water and Air Relief Valves, of which the following is a specification.

This invention relates to that class of valves, in which a movable float or motor controlled by the accumulation of water of condensation in the valve body controls the outlet, and is provided with a tubular guide, which communicates with the outlet, and through which air passes when the valve is closed.

It is of importance in valves of this character that the friction between the float or motor and its guides should be reduced to a minimum, and at the same time that the vent or clearance provided for the passage of air through the tubular portion should be as small as possible to prevent the waste of steam and yet should not become clogged by small particles of matter that may be carried into the valve.

It is the object of this invention to accomplish these results; and by the improvements hereinafter set forth, I am able to reduce the friction, and the area of the air vent through the tubular portion while rendering said vent less liable to become clogged by particles of matter, and I am also able to keep the guiding parts clean and free from adhering particles of sticky or oily matter, which would tend to interfere with the free movement of the float or motor in opening and closing the valve.

In the drawings, Figure 1 is a vertical sectional view of a valve embodying my invention; Fig. 2 is a similar view showing a different form, and Fig. 3 is a horizontal section on the line A—A of Fig. 2.

The valve-body $a$ may be of the usual character, having an inlet $b$ and an outlet $c$. It is shown open at the top and provided with a removable screw threaded cap $d$.

$e$ is the float or motor within the valve body, having a tubular portion $g$, the lower end of which constitutes the valve-piece $f$ and rests upon the seat-piece $i$, to close the thoroughfare to the outlet $c$.

$h$ is a depending guide rod, extending in the tubular portion $g$, which acts as a guide for the float or motor as it moves. The tubular portion $g$ is of a diameter substantially greater than that of the rod so as to leave a substantial clearance between the two, but the tubular portion is provided with one or more disks $s$, $t$ each having a small hole through which the rod extends with sufficient clearance to permit the free movement of the float, and afford the necessary vent for the discharge of air. In the construction shown in Fig. 1 two disks $s$ and $t$ are used, arranged at the upper and lower portions of the tube to guide it and the float both at the top and bottom. In the construction shown in Figs. 2 and 3, however, only the upper disk $s$ is used and the float is guided at the bottom by small projections $n$ on the lower part of the float which move on the inclosing walls of the valve body.

By the use of a small rod and the guiding disks, the frictional area is greatly reduced, since it is only the small area of contact between the edges of the disk and rod, and at the same time the area of the vent due to the slight clearance between the rod and disks is reduced to a minimum. With a large rod fitting the tube, this vent is formed by the annular open space afforded by the difference between the internal diameter of the tube and the diameter of the rod. As the clearance must be substantial in extent to prevent binding and to allow small particles to pass through, it follows that, by reason of the relatively large diameter of the annular space, the area of the vent is larger than is required for the discharge of the air, and permits the escape and waste of steam. With the rod and disks, this annular space is of very much smaller diameter and consequently the clearance between the rod and edges of the disks may be substantially increased to reduce friction and afford greater width for the passage of particles of matter, while the total area of the vent is reduced and the waste of steam is prevented. The disks also perform the function of cleaning the rod and loosening from it particles of matter that may adhere to its surface. The increased width of the clearance permits the particles to pass through the disks more easily into the wide clearance between the body of the tube and the rod.

Where a long rod is used as in Fig. 1, I prefer to have it project into the opening in the valve-seat as shown. It follows that the cap cannot be screwed on until the end of this rod is inserted in the valve-seat. This insures the proper fitting together of the parts.

M is a tubular screen arranged about the float or motor to prevent particles of matter passing into the valve-seat.

What I claim as new and desire to secure by Letters Patent is as follows:—

1. In a water and air relief valve for steam heating systems, the combination of a valve body forming a chamber having an inlet and an outlet, an elongated tube carrying the valve-piece which controls said outlet and forming a communicating passageway between the outlet and the upper part of the interior of the valve when said valve-piece is seated, a motor carrying said tube, a stationary rod of relatively small diameter extending from the top of the valve down into said tube and leaving a relatively wide clearance between said rod and the surrounding walls of the tube, and a thin cleaning piece carried by said tube and acting on the rod to scrape adhering matter from its surface when said tube is raised and lowered by the motor.

2. In a water and air relief valve for steam heating systems, the combination of a valve body forming a chamber having an inlet and an outlet, an elongated tube carrying the valve-piece which controls said outlet and forming a communicating passageway between the outlet and the upper part of the interior of the valve when said valve-piece is seated, a motor carrying said tube, a stationary rod of relatively small diameter extending from the top of the valve down into said tube and leaving a relatively wide clearance between said rod and the surrounding walls of the tube, and a disk carried by said tube and extending over the tubular opening therein but having a small opening for the rod, said opening being slightly larger in diameter than said rod, so as to leave a relatively small annular clearance.

3. In a water and air relief valve for steam heating systems, the combination of a valve body forming a chamber having an inlet and an outlet, an elongated tube carrying the valve-piece which controls said outlet and forming a communicating passageway between the outlet and the upper part of the interior of the valve when said valve-piece is seated, a motor carrying said tube, a stationary rod of relatively small diameter extending from the top of the valve into said tube and leaving a relatively wide clearance between said rod and the surrounding walls of the tube, and disks carried by said tube near the top and bottom and each extending over the tubular opening therein but having a small opening for the rod, said openings being slightly larger in diameter than said rod, so as to leave a relatively small annular clearance.

4. In a water and air relief valve for steam heating systems, the combination of a valve-body forming a chamber having an inlet and an outlet, an elongated tube carrying the valve piece which controls said outlet and forming a communicating passageway between the outlet and the upper part of the interior of the valve when said valve-piece is seated, a motor carrying said tube, a removable cap for said valve-body, a rod of relatively small diameter carried by said cap and extending down into said tube and leaving a relatively wide clearance between said rod and the surrounding walls of the tube, and a disk carried by said tube and extending over the tubular opening therein but having a small opening for the rod, said opening being slightly larger in diameter than said rod, so as to leave a relatively small annular clearance.

In testimony of which invention, I hereunto set my hand.

JOHN G. MIDGLEY.

Witnesses:
ERNEST BROWN,
L. MORGAN.